(12) United States Patent
Poelstra et al.

(10) Patent No.: US 10,805,090 B1
(45) Date of Patent: Oct. 13, 2020

(54) ADDRESS WHITELISTING USING PUBLIC/PRIVATE KEYS AND RING SIGNATURE

(71) Applicant: Blockstream Corporation, Montreal (CA)

(72) Inventors: Andrew Poelstra, Austin, TX (US); Glenn Willen, Mountain View, CA (US); Gregory Maxwell, Mountain View, CA (US); Gregory Sanders, Greenbelt, MD (US); Jonas Nick, Frankfurt (DE); Matt Corollo, New York City, NY (US)

(73) Assignee: Blockstream Corporation, Montreal (CA)

( * ) Notice: Subject to any disclaimer, the term of this patent is extended or adjusted under 35 U.S.C. 154(b) by 183 days.

(21) Appl. No.: 15/934,847

(22) Filed: Mar. 23, 2018

Related U.S. Application Data (60) Provisional application No. 62/476,168, filed on Mar. 24, 2017.

(51) Int. Cl.
*H04L 9/32* (2006.01)
*H04L 9/30* (2006.01)
*H04L 29/06* (2006.01)

(52) U.S. Cl.
CPC .......... *H04L 9/3255* (2013.01); *H04L 9/3066* (2013.01)

(58) Field of Classification Search
CPC . G06F 16/1805; G06F 21/64; H04L 2209/38; H04L 2209/56; H04L 9/3226;
(Continued)

(56) References Cited

U.S. PATENT DOCUMENTS

2012/0089494 A1* 4/2012 Danezis ................. G06Q 50/06
705/34
2012/0296829 A1* 11/2012 Camenisch ........ G06Q 30/0603
705/67

(Continued)

OTHER PUBLICATIONS

Rivest et al., "How to Leak a Secret," C. Boyd (Ed): ASIACRYPT 2001, LNCS 2248, pp. 552-565, 2001.

(Continued)

*Primary Examiner* — Gary S Gracia
(74) *Attorney, Agent, or Firm* — Dergosits & Noah LLP; Todd A. Noah (57) ABSTRACT

Systems and methods are described for transferring and verifying the transfer of an asset from a limited-participant side chain back to a main blockchain. A public difference, associated with a secret difference, is determined as a difference between a main blockchain address and the public offline key of a transferring participant. The public difference is used, along with each participant public online key, to generate a ring signature key for each participant. A ring signature is then generated over the ring signature keys, based on the public online keys and a set of uniform random scalars (each associated with a participant public online key). The main blockchain address, a first coefficient from the ring signature, and the uniform random scalars are then published. When verified, the published ring signature shows that the transferring participant has control of the main blockchain address and the private offline key.

13 Claims, 5 Drawing Sheets

(58) Field of Classification Search
CPC ... H04L 9/3236; H04L 9/3239; H04L 9/3247; H04L 9/3268
See application file for complete search history.

(56) References Cited

U.S. PATENT DOCUMENTS

| | | | | |
|---|---|---|---|---|
| 2016/0330034 | A1* | 11/2016 | Back | G06Q 20/065 |
| 2016/0342989 | A1* | 11/2016 | Davis | G06Q 20/3674 |
| 2016/0358165 | A1* | 12/2016 | Maxwell | G06Q 20/0655 |
| 2017/0154331 | A1* | 6/2017 | Voorhees | H04L 67/20 |
| 2017/0236104 | A1* | 8/2017 | Biton | H04L 9/30 |
| | | | | 705/64 |
| 2017/0323294 | A1* | 11/2017 | Rohlfing | G06Q 20/3674 |
| 2018/0089641 | A1* | 3/2018 | Chan | G06Q 20/4037 |
| 2018/0096163 | A1* | 4/2018 | Jacques de Kadt | G06F 16/23 |
| 2018/0101906 | A1* | 4/2018 | McDonald | G06Q 20/405 |

OTHER PUBLICATIONS

Möser, "Anonymity of Bitcoin Transactions," Münster Bitcoin Conference (MBC), Jul. 17-18, 2013, Münster Germany, 10 pages.
Van Saberhagen, "CryptoNote v. 2.0," Oct. 17, 2013, 20 pages.

\* cited by examiner

ADDRESS WHITELISTING USING PUBLIC/PRIVATE KEYS AND RING SIGNATURE

CROSS-REFERENCE TO RELATED APPLICATIONS

This application claims the benefit of U.S. Provisional Application No. 62/476,168, filed Mar. 24, 2017, which is incorporated herein in its entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital cryptocurrencies, and more specifically to transferring an asset on a side chain ledger to a main blockchain such that control of an address associated with a main blockchain may be proven without associating a participant identity with the address.

SUMMARY OF THE INVENTION

Systems and methods are described for transferring an asset on a ledger of a side chain having a fixed set of participants to a main blockchain, where the asset was originally transferred from the main blockchain to the side chain ledger. At a setup time of the side chain, two secret keys each participant may provide an offline key and an online key. Public versions of the two secret keys may also be provided by each participant by multiplying by point G of an elliptic curve group, the public versions being provided to every participant in the fixed set. When the transfer of the asset is performed, a public main blockchain address is received, and a computing device of a transferring participant may generate a public difference for each participant based on each participant public offline key and the public main blockchain address The computing device may then generate a ring signature key for each of the fixed set based on the generated public online keys and generated public differences. A ring signature may then be generated over the generated set of ring signature keys, based on the generated public online keys, a first uniform random scalar, and a set of second uniform random scalars. The uniform random scalars may each be associated with a generated public online key, and, to generate the ring signature, a set of coefficients may be determined. The transaction may be completed by publishing the ring signature on a sidechain ledger stored on a sidechain server in communication with the server of the transferring participant, the published ring signature including the main blockchain address, a first coefficient of the set of coefficients, and a scalar set including the first uniform random scalar and the set of second uniform random scalars. The published ring signature may be retrieved from the side chain ledger by a computing device of at least one of the other participants and verified to indicate that the transfer of the asset is valid, the verification showing that the transferring participant has control of the main blockchain address and the private offline key.

In addition to the foregoing, systems and methods for verifying transfer of the asset from the side chain to the main blockchain on the side chain ledger are described. To perform the verification, a processor (e.g. of a computing device of one of the other participants) in communication with the sidechain server storing the side chain ledger may determine a set of ring signature keys based on a hash function applied to a difference between a received main blockchain address and public offline keys associated with each participant of the fixed set. The outputs of the hash functions may then be multiplied by point G of the elliptic curve group described above, and added to the public online keys of the corresponding participants. As described above, the received main blockchain address may be retrieved from a published ring signature on the side chain ledger, the set of participants having an index where an index number is associated with each participant. A set of coefficients may be determined by the processor based on the determined set of ring signature keys, a received set of second uniform random scalars obtained from the published ring signature, a received first coefficient also from the published ring signature, and the hash function, where each of the determined set of coefficients are further based on a previous participant coefficient according to the index. A first coefficient may be determined based on a first uniform random scalar from the received set of second uniform random scalars, a last determined coefficient according to the index and a last determined ring signature key, also according to the index. The received main blockchain address may be compared to the public address associated with the main blockchain, where the transfer being verified when the determined first coefficient is equal to the received first coefficient and the received main blockchain address corresponds to the public address associated with the main blockchain.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Since the introduction of Bitcoin (see S. Nakamoto, *Bitcoin: A peer-to-peer electronic cash system,* 2009, https://www.bitcoin.org/bitcoin.pdf, incorporated herein by reference) in 2009, there has been great interest in the potential of decentralized cryptocurrencies. The present invention implements a scheme by which members of a fixed group, having fixed signing keys, can prove control of an arbitrary new key without associating their own identity (only that they belong to the group) to the new key. The application is to patch ring-signature-like behavior onto a main blockchain, such as Bitcoin or Pretty Good Privacy ("PGP"), which does not directly support this. This delegation, to an arbitrary new key, is referred to herein as "whitelisting" because a dynamic whitelist of authorized keys may be created for repeated use by members of the fixed group.

For example, suppose there is a private sidechain with a fixed membership set but stronger privacy properties than a main blockchain (e.g., Bitcoin). When moving coins from the private sidechain back to the main blockchain, it is desirable that the destination main blockchain addresses be provably in control of a participant of the sidechain. This prevents malicious or erroneous behavior on the sidechain, which can likely be resolved by its participants, from translating to theft on the wider main blockchain network, which may be irreversible.

One way to allow sidechain participants to whitelist arbitrary keys would be to simply have participants sign the key they want to whitelist. To avoid revealing their specific identity, they could use a ring signature, such as a Borromean ring signature. A problem with this solution, however, is that it only proves that a participant signed off on a ring signature key, not that they control it (or any main blockchain address associated with the ring signature key). Thus any security failure that allows text substitution could be used to subvert this and redirect coins to an attacker-controlled address.

Another way to allow sidechain participants to whitelist arbitrary keys is to have a participant sign an arbitrary message with the sum of a key P and the whitelisted key W. Such a signature with the key P+W proves knowledge of either (a) discrete logarithms of both P and W; or (b) neither, since the sum would have to match the sum of P+W. This makes directly attacking participants' signing schemes much harder, but allows an attacker to whitelist arbitrary "garbage" keys by computing W as the difference between an attacker-controlled key and P. The effect of garbage keys is to "burn" stolen coins on the main blockchain, destroying them by transferring the sidechain coins to a main blockchain address associated with W when the sidechain asset ring signature is published on the sidechain ledger. Since the attacker does not know P and the participant associated with P does not know the attacker-controlled key, neither party would be able to access the stolen coins. In an important sense, this "burning coins" attack may be a good thing: it permits offline delegation. That is, the key P does not need to be available on the ledger at the time of the transaction. Instead, participants could choose S=P+W, sign with this to transfer an asset to the main blockchain, and only later compute the discrete logarithm of W=P−S. This allows P to be in cold storage or be otherwise inaccessible, improving the overall system security.

A modification of the difference-of-keys described above, which prevents this "garbage key" attack, is to instead have participants sign some message with the key P+H(W)W, for H some random-oracle hash that maps group elements to scalars. This resultant key, and its discrete logarithm, cannot be known until after W is chosen, so W cannot be selected as the difference between it and P. (Note that P could still be some chosen difference; however P is a fixed key and must be verified out-of-band to have come from a legitimate participant anyway.) This scheme no longer supports offline delegation. However, offline delegation can be achieved by introducing an offline key, P', and signing with the key P+H(W+P')(W+P'). This provides the best of both worlds: P' does not need to be online to delegate, allowing it to be securely stored and preventing real-time attacks on the underlying address behind W. P does need to be online, but its compromise only allows an attacker to whitelist "garbage keys", not attacker-controlled ones.

The present invention allowing sidechain participants to whitelist arbitrary keys utilizes a different scheme: each participant i chooses two keys, P_i and Q_i. P_i may be referred to as the "online key" and Q_i as the "offline key". To whitelist a key W, the transferring participant computes the public main blockchain key L_j=P_j+H(W+Q_j)(W+Q_j) for every participant j of the sidechain. The transferring participant will accordingly know the discrete logarithm of L_i for their own keys P_i and Q_i. Next, the transferring participant signs a message containing every P_i and Q_i as well as W with a ring signature over all the public main blockchain keys L_j. This proves that the transferring participant knows the discrete logarithm of some L_i (though it is zero-knowledge which one), and therefore knows a) the discrete logarithms of all of W, P_i and Q_i, or b) the discrete logarithm of P_i but of neither W nor Q_i. In other words, compromise of the online key P_i allows an attacker to whitelist "garbage keys" for which nobody knows the discrete logarithm; to whitelist an attacker-controlled key, the attacker must compromise both P_i and Q_i. This is difficult because by design, only the sum S=W+Q_i is used when signing; then by choosing S freely, a participant can delegate without the secret offline key to Q_i ever being online. Later, when the transferring participant wants to actually use W, they will need to compute its key as the difference between S and Q_i; but this can be done offline and much later and with more expensive security requirements.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 1A:
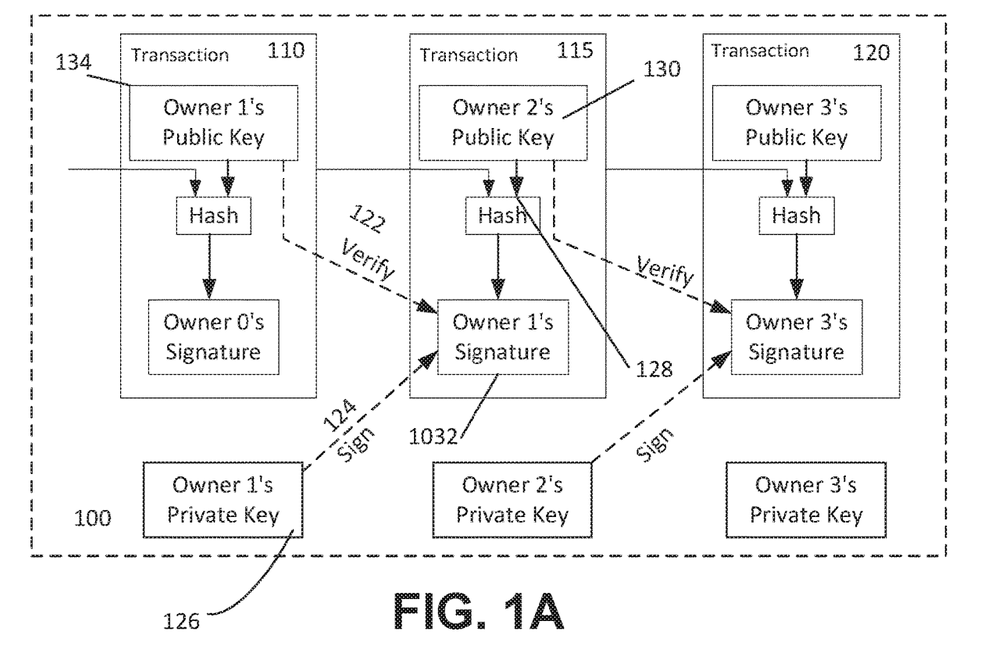
FIGS. 1A-B show simplified block diagrams of a chain of digital signatures of a plurality of transactions and a proof-of-work system, respectively, according to various embodiments.
Figure 1B:
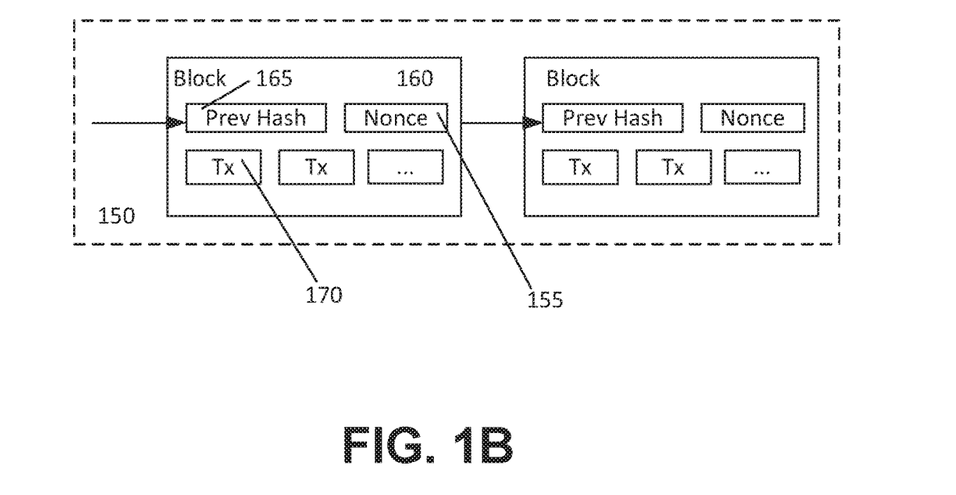

To further elaborate the storing and verification of transactions on blockchain ledgers, FIGS. 1A-B show simplified block diagrams of a chain of digital signatures 100 of a plurality of transactions and a proof-of-work system 150, respectively, according to various embodiments. The chain of digital signatures may be, for example, a ledger entry stored on a server of a side chain to a main blockchain. In the digital signature chain 100, each owner transfers amounts of the assets to the next owner by digitally signing a hash of the previous transaction involving the assets and the public key of the next owner, and adding these to the end of each asset. A payee can verify the transferred signatures to verify the chain of ownership, thus showing the asset to be legitimate. For example, in transaction 115, the transferring owner, Owner 1, digitally signs hash 128 of previous transaction 110 involving the transferred asset and the public key 130 of Owner 2, the recipient of the asset, to produce a signature for Owner 2 132 at step 124. To perform the step of verifying the signature, Owner 2 may use Owner 1's public key 134 at verification step 122. Subsequent transaction 120 may be implemented in the same fashion as transaction 115. In some embodiments, Owner 2 may be the same as Owner 1, such as when a participant of a side chain wishes to transfer side chain assets back to the main block chain.

To assist in making sure a previous owner of an asset did not transact the same asset twice, a proof of work system 150 may be implemented on each block in a ledger (such as a ring signature). For an exemplary timestamp scheme, the proof-of-work may be implementing by incrementing a nonce (number used once, a conventional cryptographic concept) 155 in the block 160 until a value is found that gives the block's previous hash 165 the required zero bits initially recorded with the asset. As seen in system 150 (implemented on a side chain server, for example), each block 160 may also include the ring signature 170 allowing other participants of the side chain to verify control of an address associated with a main blockchain without associating the transferring participant's identity with the address.

Figure 2:
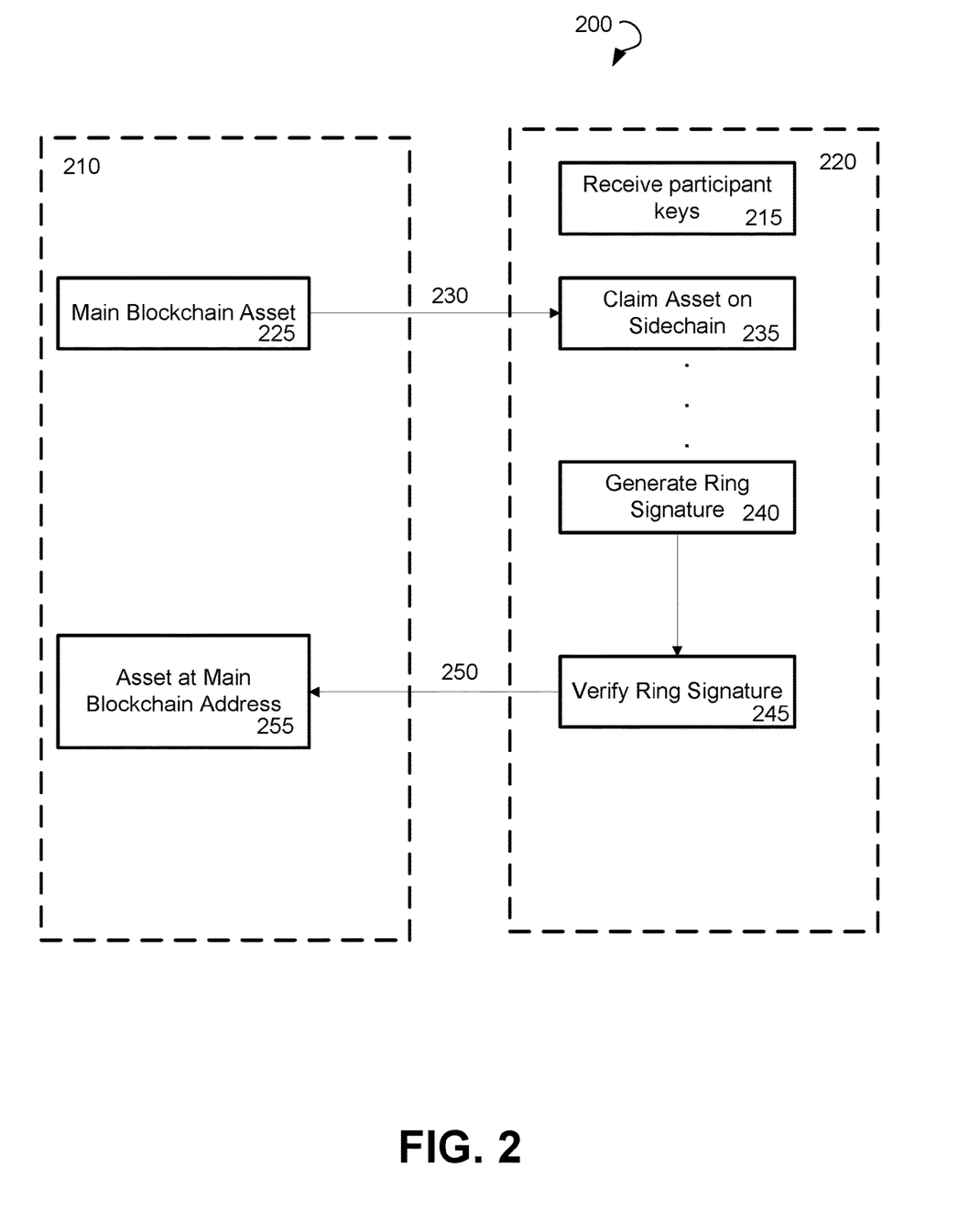
FIG. 2 shows a flow diagram for transferring an asset on a side chain ledger to a main blockchain such that control of an address associated with a main blockchain may be proven without associating a participant identity with the address, under an embodiment.

FIG. 2 shows a flow diagram for a method 200 for transferring an asset from a main blockchain 210 to a sidechain ledger 220, under an embodiment, such that control of an address associated with a main blockchain may be proven without associating a participant identity with the address. In method 200, at a setup time, two secret keys may be created for each participant in the fixed set; an online key and an offline key at step 215. Different computing devices may be used by each participant to generate the secret keys, as each participant may be responsible for generating their own secret keys in some embodiments. Also at step 215, participants may use computing devices to generate public versions of the two secret keys by multiplying each secret key by point G of an elliptic curve group. The public versions of the online key and offline key may be published by the participants so that each participant of the fixed set has access to the entire set of public online and offline keys for each other participant after being created at step 215.

As an example, suppose there are n participants of the fixed set. The elliptic curve group G' would be generated by the point G, and a 256-bit prime number p exists such that curve group G' has p points. The integers mod p, denoted Z/pZ, are then isomorphic to G' (having a one-to-one relationship) according to the mapping $x \rightarrow xG$. Z/pZ are also referred to below as scalars and the p elements of G' are also referred to as points. By multiplying the secret online key and the secret offline key by point G, points on the elliptic curve group G' are associated with the keys while obscuring the secret key values to outsiders to the side chain. At setup time, for each participant $i \in \{1, \ldots, n\}$ two secret keys would be determined: an offline participant key $p^i_{on}$ and an online participant key $p^i_{off}$. The corresponding public keys may be expressed as $P^i_{off} = p^i_{off} * G$ and $P^i_{on} = p^i_{on} * G$. These public keys would be registered as part of the public parameters of the system and made available to each participant of the side chain.

Returning to method 200, a processor may send a parent chain asset 225 to the side chain ledger 220 having a fixed set of participants at step 230. This may be done to take advantage of features on the side chain ledger 220 (such as greater security, privacy, and/or flexibility) that are not available on the larger main blockchain 210. At step 235, the asset may be claimed by a participant of the sidechain ledger 220. When the participant wishes to transfer the asset back to the main blockchain, a ring signature may be generated by the computing device of the transferring participant at step 240. The generation of the ring signature is described in further detail below, in the discussion of FIG. 3. The ring signature for the transaction is published on the side chain ledger 220. The ring signature is verified by one or more other participants of the side chain at step 245, which includes the verifying participant checking that the main blockchain address is derived from the public differences included in the ring signature. The asset may be transferred back to the main blockchain at step 250 when the ring signature is verified (meaning the transferring participant has control over both the public online key and the whitelisted key corresponding to the main blockchain address). At this point the asset is transferred to the main blockchain address at step 255, where the transferring participant may use their public offline key to access the main blockchain address.

Figure 3:
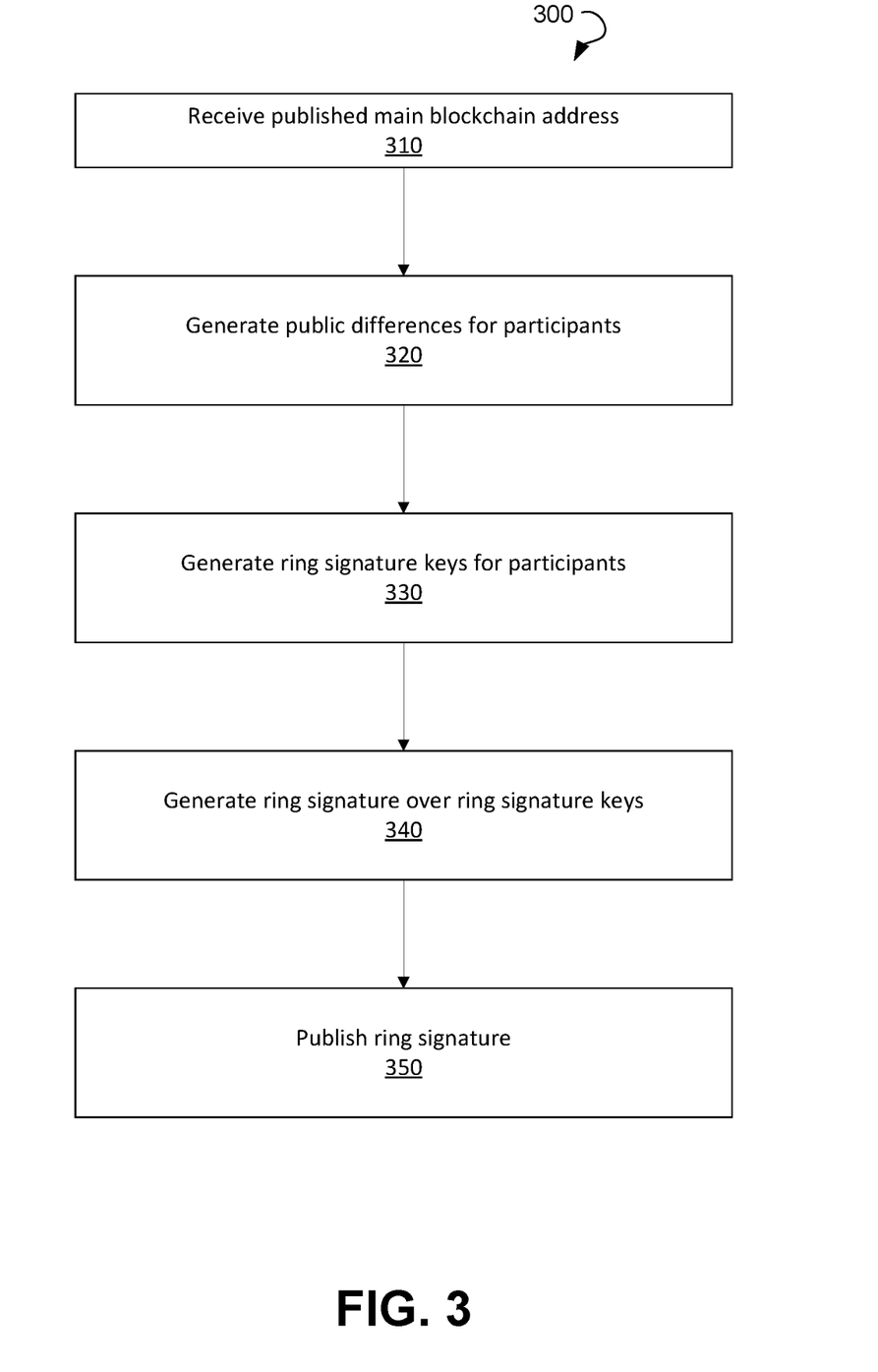
FIG. 3 shows a flow diagram for creating and publishing a ring signature for a whitelisted main blockchain address as part of transferring an asset on a side chain ledger to a main blockchain, under an embodiment.

As stated above, a ring signature is made by a transferring participant when they wish to move the asset back to the main blockchain. FIG. 3 shows a flow diagram for a method 300 of creating and publishing a ring signature for a whitelisted main blockchain address as part of transferring an asset on a side chain ledger to a main blockchain, under an embodiment. At step 310, a computing device of the transferring participant may receive a public main blockchain address A. The secret main blockchain address (e.g., a Bitcoin address) used in the transaction can be deterministically derived from the public main blockchain address A using any suitable method. The secret main blockchain address may be derived, for example, by taking the public offline key, embedding it in a Bitcoin script of a particular form, hashing the result with SHA256 then RIPEMD160, and encoding the resulting hash in a format called "base58check." The computing device may then generate a public difference D for each participant based on each participant public offline key and the received public main blockchain address at step 320. This may be expressed as, for each participant $j \in \{1, \ldots, n\}$, the public difference may be calculated as $D_j = A - P^i_{off}$.

The computing device may then generate a ring signature key for each of the fixed set based on the generated public online keys for each participant and a generated public difference $D_j$ at step 330. In an embodiment, each public difference $D_j$ may be determined as the difference between the main blockchain address and a public offline key of a participant j. The ring signature key may then be determined as a sum of the participant public online key and a product of the public difference $D_j$ and a hash function applied to the public difference $D_j$. That is, for each $j \in \{1, \ldots, n\}$, the computing device may determine a ring signature key $P_j \leftarrow P^i_{on} + H(D_j)D_j$ for each participant j (including the transferring participant) where function H may be defined as a hash function modeled as a random oracle.

A ring signature may then be generated at step 340 over the generated set of ring signature keys $\{P_i\}_{j=1}^n$. Any suitable ring signature may be used. For example, RST ring signatures, AOS ring signatures, or short accountable ring signatures are all examples of ring signatures that may be used. In an exemplary embodiment, the ring signature may be generated based on the generated public online keys $P^i_{on}$ (for i ranging from 1 to n), a first uniform random scalar k, and a set of second uniform random scalars $s_j$. The uniform random scalars may each be associated with a generated public online key, and, to generate the ring signature, a set of coefficients may be determined and a uniform random scalar may be determined for the transferring participant. For example, assume the set of participants having an index where an index number is associated with each participant from 1 to n, where the transferring participant is the $i^{th}$ number in the index. The transferring participant may choose scalar k uniformly randomly and determine an $i^{th}$ coefficient (corresponding to the transferring participant) based on a hash of the first uniform random scalar and a point on the elliptic curve group (e.g., $e_i \leftarrow H(\{P_j\}_{j=1}^n \| kG \| i)$. The hash function may be the same hash function used to generate the ring signature keys, and G likewise may be the same point on the elliptic curve used to determine the public differences $D_j$ for the participants. Coefficients for every other participant in the set of participants may be determined based on a second uniform random scalar for each other participant, a coefficient for a previous participant according to the index, and a public online key of the previous participant. For example, the formula for determining coefficients for the other participants may be expressed as: $e_j \leftarrow H(\{P_j\}_{j=1}^n \| s_j G + e_{j-1} P_{j-1} \| j)$, for j from i+1 to n and from 1 to i−1, and where scalar sj is selected uniformly at random by the transferring participant. For the first coefficient $e_1$, the coefficient $e_0$ is defined to equal $e_n$. Finally, the computing device may determine the $i^{th}$ uniform random scalar of the second uniform random scalars for the transferring participant based on the first uniform random scalar, the determined $i^{th}$ coefficient (described above) and the secret difference (e.g., using the formula $s_i = k - e_i d$.)

The transaction may be completed by publishing the ring signature on a sidechain ledger stored on a sidechain server in communication with the computing device of the transferring participant at step 350. The published ring signature may include the main blockchain address A, a first coefficient $e_1$ of the set of coefficients, and a scalar set including the $i^{th}$ uniform random scalar and the set of second uniform random scalars. In some embodiments, the published first coefficient $e_1$ may be a coefficient corresponding to a participant besides the first in the index j. To verify the ring signature, is only required that the verifier know the index number of the participant the first coefficient corresponds to, and that the choice of published coefficient reveal no information about the index number i of the transferring participant who produced the ring signature. The published ring signature, which may be expressed as [A, $e_1 \{s\}_{j=1}^n$], is verified on the side chain ledger by at least one of the participants to indicate that the transfer of the asset is valid, the verification showing that the transferring participant has control of the main blockchain public address and the public offline key (used to create the secret difference.

Figure 4:
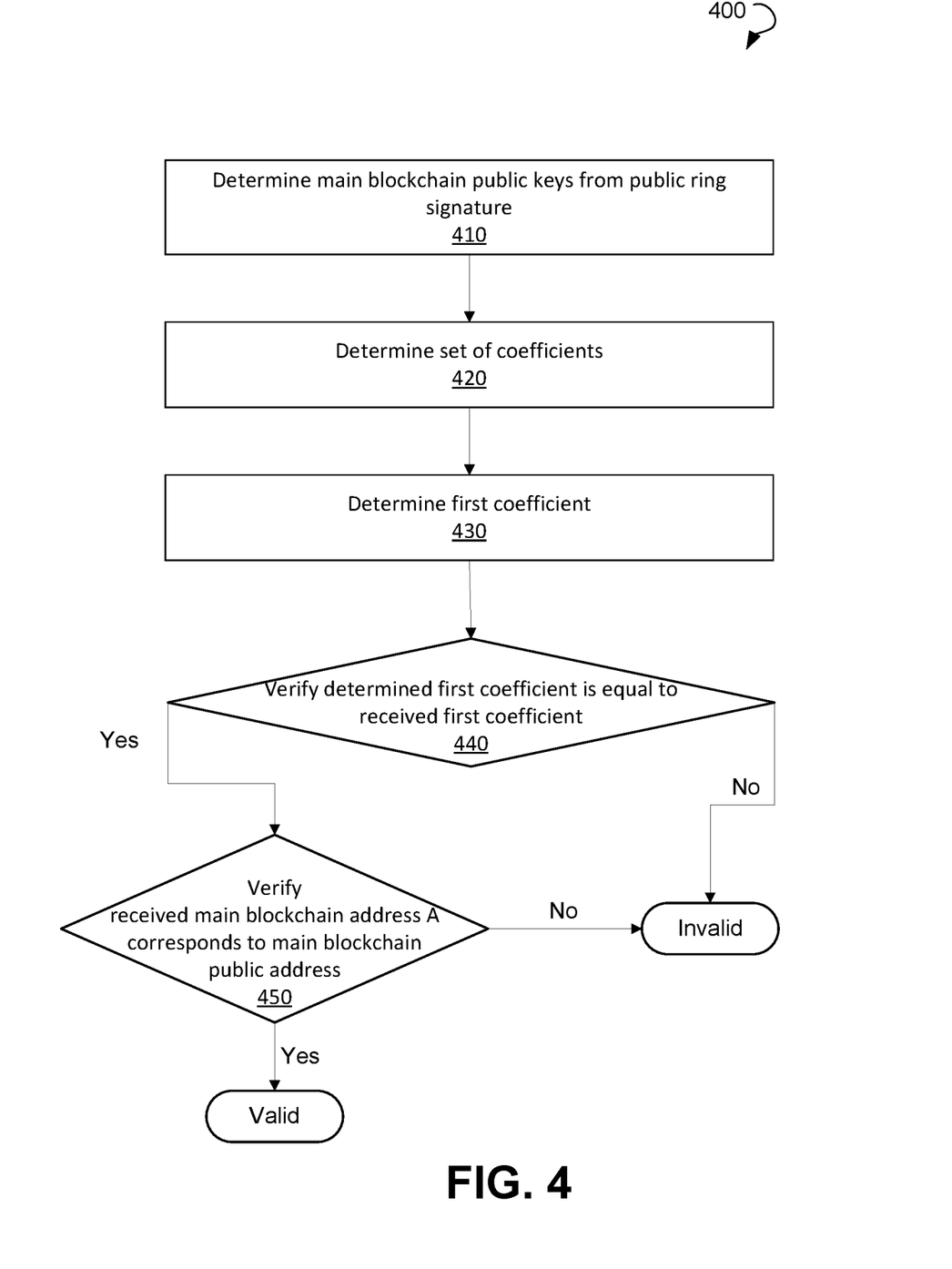
FIG. 4 shows a flow diagram for verifying transfer of asset on a side chain ledger to a main blockchain such that control of an address associated with a main blockchain may be proven without associating a participant identity with the address, under an embodiment.

FIG. 4 shows a flow diagram for a method 400 of verifying transfer of asset on a side chain ledger to a main blockchain such that control of an address associated with a main blockchain may be proven without associating a participant identity with the address, under an embodiment. The verifier, a participant of the fixed set, would have access to the candidate ring signature [A, $ê_1 \{s\}_{j=1}^n$] from the side chain ledger and public keys $\{(P_{on}^j, P_{off}^j)\}_{j=1}^n$ from setup of the side chain. To perform the verification, a processor in communication with the server storing the side chain ledger may determine the set of ring signature keys based on a hash function applied to determined public differences $D_j$ and public online keys associated with each participant of the fixed set at step 410. As described above, each public difference $D_j$ is determined as the difference between the received main blockchain address A and a public offline key of each participant j, the set of participants having an index where an index number is associated with each participant. For example, for each participant in the index of participants $j \in \{1, \ldots, n\}$ the verifier would compute a ring signature key $Pj \leftarrow P_{on}^j + H(D_j) D_j$ (as described above).

A set of coefficients may then be determined at step 420 by the processor based on the determined set of ring signature keys, a received set of second uniform random scalars obtained from the published ring signature, a received first coefficient also from the published ring signature, and the hash function, where each of the determined set of coefficients are further based on a previous participant coefficient according to the index. That is, For $j \in 2, \ldots, n$ of the index of participants j, the verifier computes $e_j \leftarrow H(\{P_j\}_{j=1}^n \| s_j G + e_{j-1} P_{j-1} \| j)$ to obtain all coefficients except the first coefficient $e_1$.

The first coefficient $e_1$ may be determined at step 430 based on a first uniform random scalar from the received set of second uniform random scalars, a last determined coefficient according to the index and a last determined ring signature key, also according to the index. For example, the first coefficient may be determined by the formula: $e_1 \leftarrow H(\{P_j\}_{j=1}^n \| s_1 G + e_n P_n \| 1)$ The determined first coefficient $e_1$ may be compared to the received first coefficient $ê_1$ at step 440, where the ring signature (and thus, control over the ring signature key $P_j$) is verified when the determined first coefficient is equal to the received first coefficient. The determined first coefficient not being equal to the received first coefficient signifies that the ring signature is invalid, and thus the transfer is rejected (as shown in FIG. 4). However, verification is not yet complete. As stated above, a valid proof shows that the transferring participant knows the discrete logarithm of some ring signature key $P_j$ (though it is zero-knowledge which one), and therefore knows a) the discrete logarithms of all of main blockchain address A, public online key $P^i_{on}$ and public offline key $P^i_{off}$, or b) the discrete logarithm of $P^i_{on}$ but of neither A nor $P^i_{off}$. Therefore, to validate the transfer, the validating participant also compares the received main blockchain address A to the public address associated with the main blockchain at step 450. The public address associated with the main blockchain may be separately received, or may also be published on the sidechain ledger. The transfer is verified when the determined first coefficient is equal to the received first coefficient and the sum is equal to the public address associated with the main blockchain, demonstrating that the transferring participant has control over the public online key and both the whitelisted key and the public offline key, as shown in FIG. 4. While the validation steps 410-440 are shown taking place before step 450 in method 400, this order may be reversed in other embodiments, as any suitable order of these steps may be used to validate the transfer.

Figure 5:
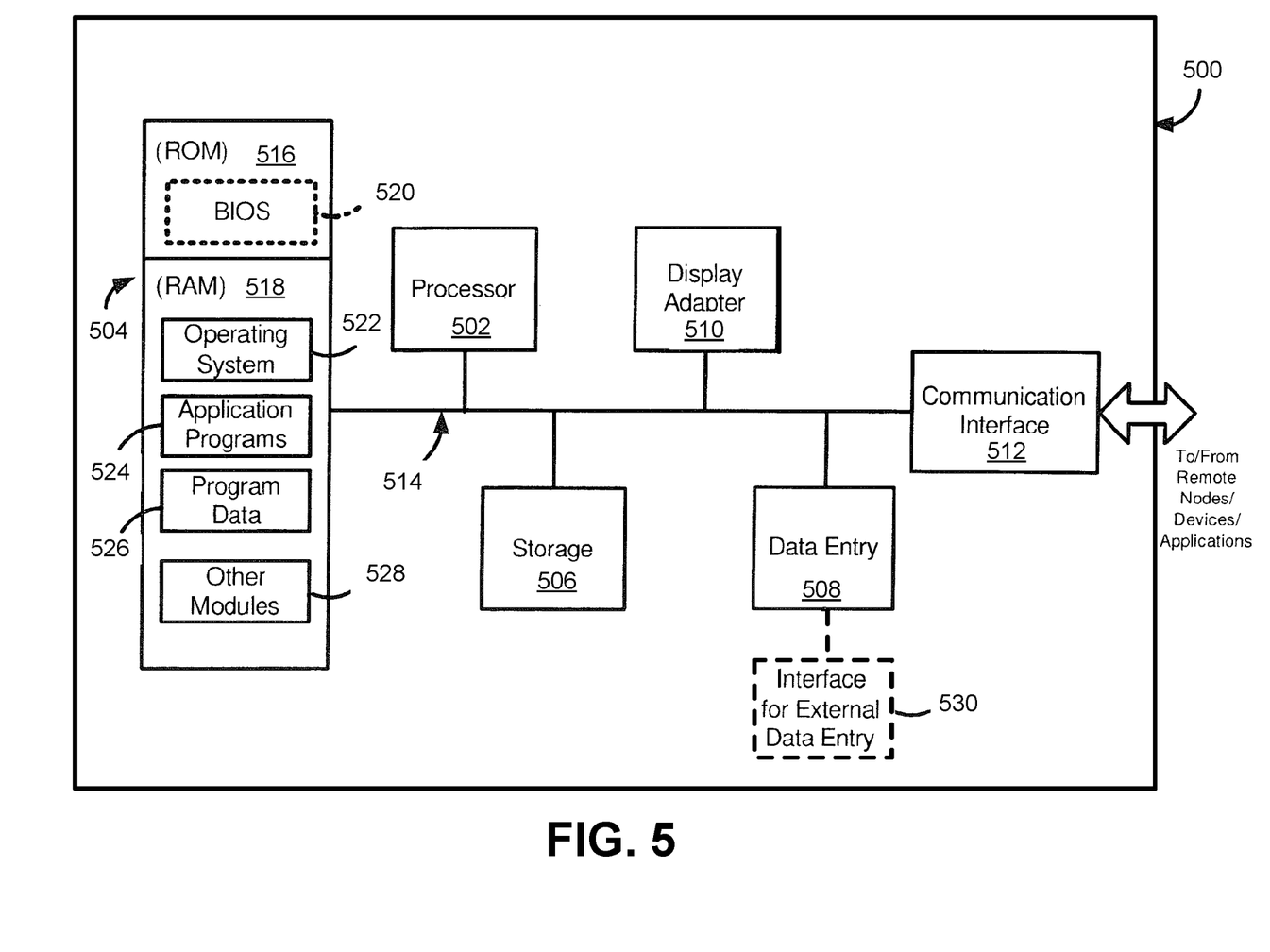
FIG. 5 is a block diagram of an exemplary system used in transferring an asset on a side chain ledger to a main blockchain such that control of an address associated with a main blockchain may be proven without associating a participant identity with the address in accordance with various embodiments of the present invention.

FIG. 5 is a block diagram of an exemplary system for transferring an asset on a side chain ledger to a main blockchain such that control of an address associated with a main blockchain may be proven without associating a participant identity with the address in accordance with various embodiments of the present invention. With reference to FIG. 5, an exemplary system for implementing the subject matter disclosed herein, including the methods described above, includes a hardware device 500, including a processing unit 502, memory 504, storage 506, data entry module 508, display adapter 510, communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in memory 504 and/or storage 506 and/or received via data entry module 508.

The memory 504 may include read only memory (ROM) 516 and random access memory (RAM) 518. Memory 504 may be configured to store program instructions and data during operation of device 500. In various embodiments, memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 504 may also include nonvolatile memory technologies such as nonvolatile flash RAM (NVRAM) or ROM. In some embodiments, it is contemplated that memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, ROM 516 or RAM 518, including an operating system 522, one or more applications programs 524, program data 526, and other program modules 528. A user may enter commands and information into the hardware device 500 through data entry module 508. Data entry module 508 may include mechanisms such as a keyboard, a touch screen, a pointing device, etc. Other external input devices (not shown) are connected to the hardware device 500 via external data entry interface 530. By way of example and not limitation, external input devices may include a microphone, joystick, game pad, satellite dish, scanner, or the like. In some embodiments, external input devices may include video or audio input devices such as a video camera, a still camera, etc. Data entry module 508 may be configured to receive input from one or more users of device 500 and to deliver such input to processing unit 502 and/or memory 504 via bus 514.

The hardware device 500 may operate in a networked environment using logical connections to one or more remote nodes (not shown) via communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 512 may include logic configured to support direct memory access (DMA) transfers between memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of hardware device 500 illustrated in FIG. 5 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 500. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for transferring an asset on a side chain ledger to a main blockchain, where the asset was originally transferred from the main blockchain to the side chain ledger, the side chain having a fixed set of participants, comprising:
   receiving a public main blockchain address, where each participant is associated with a secret offline key and a secret online key, and each participant is also associated with public versions of the two secret keys generated by multiplying each key by point G of an elliptic curve group, the public versions being provided to every other participant in the fixed set, the secret keys for each participant being generated using different computing devices;
   when the transfer of the asset is performed, generating, by a computing device associated with a participant wanting to transfer the asset back to the main blockchain, a public difference for each participant based on each participant public offline key and the public main blockchain address, such that when the asset is transferred to the main blockchain address, access to the main blockchain address by the transferring participant is based on the public offline key associated with the transferring participant and control of the address is proven without associating a participant identity with the address;
   generating, by the computing device associated with the transferring participant, a ring signature key for each of the fixed set of participants based on the generated public online keys for each participant and the generated public differences for each participant;
   generating a ring signature, over the generated set of ring signature keys; and
   publishing the ring signature on a sidechain ledger, the published ring signature being verified on the side chain ledger by at least one of the participants to indicate that the transfer of the asset is valid.

2. The method of claim 1, where each ring signature key is equal to a sum of a participant public online key and a product of the participant's generated public difference and a hash function applied to the participant's generated public difference.

3. The method of claim 1, the ring signature being generated based on the generated public online keys, a first uniform random scalar, and a set of selected second uniform random scalars, where the uniform random scalars are each associated with a generated public online key, the generating the ring signature comprising determining a set of coefficients and determining a uniform random scalar for the transferring participant, where the published ring signature comprises the public main blockchain address, a first coefficient of the set of coefficients, and a scalar set including the determined uniform random scalar and the set of selected second uniform random scalars.

4. The method of claim 3, the determining the uniform random scalar for the transferring participant comprising determining an $i^{th}$ coefficient of the set of coefficients based on a hash of the first uniform random scalar and a point on the elliptic curve group, the set of participants having an index where an index number is associated with each participant, the generating the ring signature further comprising:

determining an $i^{th}$ uniform random scalar of the second uniform random scalars for the transferring participant based on the first uniform random scalar, the determined $i^{th}$ coefficient and the secret difference; and determining coefficients for every other participant in the set of participants based on a second uniform random scalar for each other participant, a coefficient for a previous participant according to the index, and a public online key of the previous participant.

5. The method of claim 4, where the first coefficient is the determined $i^{th}$ coefficient.

6. The method of claim 4, where the first coefficient is the determined coefficient for another participant of the set of participants.

7. The method of claim 4, the $i^{th}$ coefficient being determined by the formula: $e_i \leftarrow H(\{P_j\}_{j=1}^n \| kG \| i)$.

8. The method of claim 4, the coefficients for the other participants being determined by the formula: $e_j \leftarrow H(\{P_j\}_{j=1}^n \| s_j G + e_{j-1} P_{j-1} \| j)$.

9. The method of claim 4, the $i^{th}$ uniform random scalar being determined by the formula:

$$s_i = k - e_i d.$$

10. A method for verifying transfer of an asset from a side chain to a main blockchain on a side chain ledger, the side chain having a fixed set of participants, comprising:

determining, by a processor circuitry associated with a computing device of a participant wanting to verify transfer of the asset to the main blockchain, the computing device being in communication with a sidechain server storing the side chain ledger, a set of ring signature keys, each ring signature key being based on a hash function applied to a difference between a received main blockchain address A and public offline keys associated with each participant of the fixed set, the output of the hash function being multiplied by a standard elliptic curve group generator G and added to public online keys setoff each corresponding participant, the received main blockchain address A being from a published ring signature on the side chain ledger associated with control of a public address associated with the main blockchain, the set of participants having an index where an index number is associated with each participant;

determining, by the processor circuitry, a set of coefficients based on the determined set of ring signature keys, a received set of second uniform random scalars obtained from the published ring signature, a received first coefficient also from the published ring signature, and the hash function, each of the determined set of coefficients being further based on a previous participant coefficient according to the index;

determining a first coefficient based on a first uniform random scalar from the received set of second uniform random scalars, a last determined coefficient according to the index and a last determined ring signature key, also according to the index;

comparing the determined first coefficient to the received first coefficient; and comparing the received main blockchain address A to the public address associated with the main blockchain, the transfer being verified when the determined first coefficient is equal to the received first coefficient and the received main blockchain address A corresponds to the public address associated with the main blockchain, such that when the asset is transferred to the public address associated with the main blockchain, access is based on a public offline key associated with a transferring participant and control of the public address is proven without associating a participant identity with the public address.

11. The method of claim 10, the ring signature key for each participant being equal to a sum of each participant's public online key and a product of the participant's generated public difference and the hash function applied to the participant's generated public difference.

12. The method of claim 10, the set of coefficients being determined by the formula: $e_j \leftarrow H(\{P_j\}_{j=1}^n \| s_j G + e_{j-1} P_{j-1} \| j)$.

13. The method of claim 10, the first coefficient being determined by the formula: $e_1 \leftarrow H(\{P_j\}_{j=1}^n \| s_1 G + e_n P_n \| 1)$.

* * * * *